United States Patent [19]
Cheng et al.

[11] Patent Number: 5,588,078
[45] Date of Patent: Dec. 24, 1996

[54] NON-RECIPROCAL OPTICAL WAVEGUIDE COUPLING DEVICE

[75] Inventors: Yihao Cheng, Kanata; Gary S. Duck, Nepean, both of Canada

[73] Assignee: JDS Fitel Inc., Nepean, Canada

[21] Appl. No.: 513,028

[22] Filed: Aug. 9, 1995

Related U.S. Application Data

[63] Continuation-in-part of Ser. No. 164,547, Dec. 10, 1993, abandoned.

[51] Int. Cl.$^6$ ..................... G02B 6/26
[52] U.S. Cl. ..................... 385/33; 372/703
[58] Field of Search ............ 385/20–23, 33–35, 385/74; 372/703

[56] References Cited

U.S. PATENT DOCUMENTS

| | | | |
|---|---|---|---|
| 4,239,329 | 12/1980 | Matsumoto | 350/96.15 |
| 4,375,901 | 3/1983 | Seki . | |
| 5,121,451 | 6/1992 | Grard et al. | 385/34 |
| 5,214,660 | 5/1993 | Masuko et al. | 385/34 |
| 5,267,077 | 11/1993 | Blonder | 385/35 |
| 5,283,846 | 2/1994 | Toyonaka et al. | 385/33 |

FOREIGN PATENT DOCUMENTS

| | | | |
|---|---|---|---|
| 2432725 | 2/1980 | France | G02B 7/26 |
| 9325014 | 9/1993 | WIPO | G02F 1/09 |

OTHER PUBLICATIONS

Patent Abstracts Of Japan; vol. 12, No. 288 (P–741) (3135) 8 Aug. 1988 & JP 63 065 419 (Matsushita Electric) see abstract.

*Polarization–independent in–line optical isolator with lens–free configuration,* Journal Of Lightwave Technology, vol. 10 No. 12, Dec. 1992 New York US pp. 1839–1842.

*High–Performance Single–Mode Fiber Polarization–Independent Isolators,* Kok Wai Chang and Wayne V. Sorin, Optics Letters vol. 15, No. 8, Apr. 15, 1990.

*Lens–Free Direct Integration Of Optical Isolators Into A Fiber Array,* T. Chuzenji, K, Shiraishi and S. Kawakami, OFC/IOOC'93 Technical Dig No Month.

*Polarization–Independent In–Line Optical Isolator With Lens–Free Configuration,* Kazuo Shiraishi, Tomohiro Chuzenji and Shojiro Kawakami, Journal of Lightwave Technology, vol. 10, No. 12, Dec. 1992.

*Compact Optical Isolator For Fibers Using Birefringent Wedges,* Masataka Shirasaki and Kunihiko Asama, Applied Optics, vol. 21, No. 23, Dec. 1, 1982.

*Wavelength Independent Faraday Isolator,* P.A. Schulz, Applied Optics, vol. 28, No. 20, Oct. 15, 1989.

*Primary Examiner*—John Ngo
*Attorney, Agent, or Firm*—Thomas Adams

[57] ABSTRACT

A non-reciprocal optical device for interconnecting single mode optical fiber waveguides so that a light beam can pass between the fibers in a forward direction but a reverse beam, such as might be caused by unwanted reflections, is displaced away the input fiber, includes a focussing lens unit and at least one non-reciprocal optical element in series between respective ends of an input optical fiber and an output optical fiber. The focussing lens unit has a focal length such that a light beam from the input optical fiber will be focussed onto the end of the output optical fiber. The focussing lens unit may comprise, for example, a half-pitch grin-rod lens. The non-reciprocal device is positioned adjacent one or other of the foci of the focussing lens unit. The focussing lens unit may comprise several lens elements, for example a pair of quarter pitch collimating lenses, allowing additional optical elements, such as filters, to be interposed. An isolator/wavelength division multiplexing hybrid device is formed by interposing a wavelength-division multiplexing filter and arranging the geometry so that different wavelength light beams are coupled to different output fibers. High isolation and low insertion loss are achieved in a compact device because the non-reciprocal device is placed where the width of the light beams is small.

18 Claims, 3 Drawing Sheets

NON-RECIPROCAL OPTICAL WAVEGUIDE COUPLING DEVICE

This is a continuation-in-part of application Ser. No. 08/164,547, filed Dec. 10, 1993, now abandoned.

TECHNICAL FIELD

This invention relates to optical devices, especially non-reciprocal optical devices such as isolators and circulators. The invention is also applicable to optical hybrid devices formed by integrating a non-reciprocal device with an optical filter, such as wavelength-division multiplexing (WDM) couplers.

BACKGROUND ART

Optical non-reciprocal devices, for example isolators, are arranged to pass a light beam in a forward direction but not allow a reverse beam, such as might be caused by unwanted reflections, to pass in the reverse direction. Typically, the devices achieve this non-reciprocal function by means of optical elements which displace the reverse light beam away from the axis of the input fiber.

One example of such devices is disclosed by K. W. Chang et al in an article entitled "High-performance single-mode fiber polarization-independent isolators", OPTICS LETTERS, Apr. 15, 1990, Vol. 15, No. 8, Optical Society of America, the entire contents of which are incorporated herein by reference. It includes two collimating lenses, one for expanding the light beam from an input fiber and the other for re-focussing the light onto the output fiber. A non-reciprocal isolator is located between the collimating lenses. The isolator comprises Faraday rotators and birefringent "walk-off" crystals. The arrangement is such that forward-travelling light beams are displaced in a "positive" direction and reach the output fiber whereas backward-travelling light beams are displaced in the "negative" direction and do not reach the input fiber. In this structure, however, the backward-travelling beam must be shifted by more than the width of the expanded beam to achieve good isolation. Consequently, a longer birefringent "walk-off" crystal must be used. For example, with a beam diameter of 0.5 mm., the length of birefringent crystal should be about 5 mm. This results not only in a large device but also higher cost.

A different non-reciprocal optical isolator, which dispenses with the collimating lenses and hence can be smaller, has been disclosed by K. Shiraishi et al in an article entitled "Polarization-Independent In-Line Optical Isolator with Lens-Free Configuration", Journal of Lightwave Technology, Vol. 10, No. 12, December 1992, the entire contents of which are incorporated herein by reference. Shiraishi et al use an array of thermally expanded core (TEC) fibers, i.e. which have been heated to cause their cores to expand. An isolator chip is positioned in a slot cut through the expanded portions of the fibers dividing them into input fibers and output fibers. The isolator chip comprises a sandwich of birefringent plates and Faraday rotators—without collimating lenses. The ends of the input and output fibers abut the isolator chip. Because the beam diameter from the fibers is relatively small (dependent upon the mode-field diameter of the fibers), the required isolation can be achieved with a relatively small beam shift, resulting from the use of thinner birefringent plate. The device is not entirely satisfactory, however, because the light beam is neither collimated nor guided as it passes between input and output fibers, resulting in higher loss due to diffraction and greater difficulty in achieving low back reflection with low insertion loss.

U.S. Pat. No. 4,375,910 (Seki) issued Mar. 8, 1983, the entire content of which is incorporated herein by reference, discloses an optical isolator comprising a Faraday rotator for 45° rotation of polarization, a pair of lenses arranged on opposite sides of the Faraday rotator and a pair of birefringent crystal plates on the outer sides of the respective lenses and with their "principal planes" displaced 45° from each other. Seki claims that placing the birefringent crystal plates where the light beams are constricted reduces the amount of offset needed to prevent the reflected light from returning to the source, thereby allowing thinner birefringent crystal plates to be used. Seki also states that the use of two lens elements reduces coupling loss. Nevertheless, the device is not entirely satisfactory because it would be relatively expensive to make and cannot readily be adapted to form a non-reciprocal device other than an isolator.

SUMMARY OF THE INVENTION

The present invention seeks to overcome, or at least mitigate, the disadvantages of the known devices and to provide an improved optical non-reciprocal device capable of relatively low insertion loss while being of compact size.

According to the present invention, a non-reciprocal optical waveguide-coupling device comprising a first optical waveguide and a second optical waveguide coupled by a common optical path, respective ends of the first and second optical waveguides being spaced apart along the optical path, focusing lens means disposed in the optical path between the respective ends of the first optical waveguide and the second optical waveguide, the focusing lens means having foci at or near respective ends of the waveguides, such that light beams leaving one of the foci will be re-focused by the focusing lens means at the other of the foci before coupling into the second optical waveguide, and a non-reciprocal element comprising a plurality of optical components, the components cooperating so that light beams from the first optical waveguide couple into the second optical waveguide but light beam components of any polarization from the second optical waveguide are displaced away from, and do not couple into the first optical waveguide, all of said components being situated adjacent one of the foci.

One or more additional input optical waveguides and a corresponding number of additional output optical waveguides may be provided. With such an arrangement, each input waveguide is coupled to a corresponding one of the output waveguides, while light beams from the output waveguides are displaced so that they do not couple to any of the input waveguides. Thus, several input/output pairs of waveguides can be coupled by the same focussing lens means and non-reciprocal element.

The non-reciprocal optical element may comprise a sandwich arrangement of a first birefringent crystal, an optically active crystal plate, for example a quartz half-wave plate, a Faraday rotator and a second birefringent crystal, the device acting as an isolator.

The optical non-reciprocal device may be provided with a third optical waveguide and function as a three-port circulator, the non-reciprocal optical element then being configured such that light beams from the input waveguide are coupled to the output waveguide and light beams returning from the output waveguide are coupled to the third waveguide. In this case, because the reverse or backward-travelling beam must couple precisely to the third fiber, the non-reciprocal optical element may differ from that of the isolator. In particular, it may comprise a sandwich arrangement of a first birefringent crystal, a first Faraday rotator, a "walk-off" birefringent crystal, a second Faraday rotator and a second birefringent crystal. With the same configuration, more optical waveguides may be added to form a circulator with a desired number of ports.

The non-reciprocal element may be positioned adjacent the input optical waveguide or the output optical waveguide. Two of the non-reciprocal optical elements may be provided, one adjacent each focus. The or each non-reciprocal optical element may be a single stage device or a two or more stage device. The or each stage will comprise a non-reciprocal component such as a Faraday rotator.

The focussing lens unit may comprise a plurality of lens elements with one or more additional optical elements interposed between them. For example, an isolator/wavelength-division multiplexing (WDM) coupler hybrid device may be formed by providing at least three optical waveguides, the first at one side and the second and third at the other side, a first lens element and a second lens element, and a wavelength-division multiplexing filter interposed between the first lens element and the second lens element. The arrangement, i.e. geometry and dimensions, is such that a light beam with a first wavelength leaving the first optical waveguide will be coupled to the second optical waveguide and a light beam with a second wavelength from the third optical waveguide will be reflected by the filter and coupled to the second optical waveguide.

Various other objects, features, aspects and advantages of the present invention will become more apparent from the following detailed description, taken in conjunction with the accompanying drawings, of preferred embodiments of the invention.

BEST MODE FOR CARRYING OUT THE INVENTION

Figure 1:
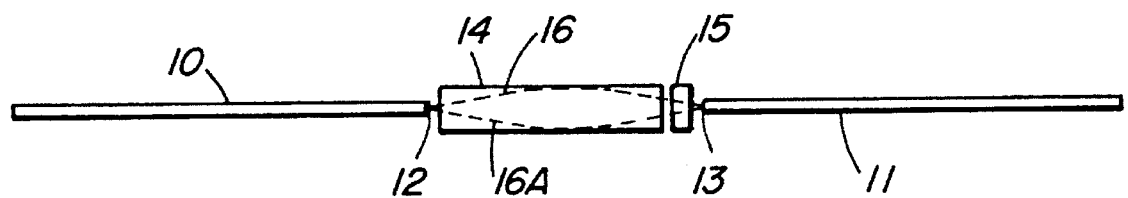
FIG. 1 is a schematic side view of an optical non-reciprocal device with two optical waveguides, specifically single mode optical fibers.

In the attached drawings, corresponding items in the different Figures have the same reference numeral, where appropriate with a suffix letter.

Referring first to FIG. 1, an optical waveguide 10 and an optical waveguide 11, each formed by a portion or "pigtail" of single mode optical fiber, are positioned with their opposed ends 12 and 13 spaced apart. A focussing lens 14 is positioned between the spaced ends 12 and 13 of the fibers 10 and 11. The opposite foci of the focussing lens means coincide with the ends 12 and 13 of the optical fibers 10 and 11. A non-reciprocal optical element 15 is positioned between the end 13 of fiber 11 and the juxtaposed end of focussing lens 14. The optical fibers 10 and 11 constitute input and output ports, respectively, of the device. The focal length of the lens 14 is such that light from the end of the input fiber 10, as indicated by dashed lines 16, 16A, will be focussed onto the end 13 of output fiber 11. In order to achieve this separation between foci, the focussing lens means may comprise a so-called "half-pitch" lens, specifically a rod lens, but foreshortened to allow for the length of the non-reciprocal optical element 15 and any other elements which may be interposed, as will be described later.

Good coupling with low insertion loss is achieved because the light beam is focussed at the fiber end. At the same time, because the non-reciprocal element 15 is adjacent the focus, where the beam width is at its narrowest, only a small shift is needed to give the required separation, resulting in compact size. The focussing lens 14 and the non-reciprocal element 15 may be of known type, selected according to the specific application of the coupling device.

Various optical devices can be fabricated using this focussing lens/non-reciprocal optical element combination, as will now be described.

In FIG. 2, the optical non-reciprocal device is an optical isolator. The focussing lens 14 is a grin-rod lens such as is marketed under the trade mark SELFOC by Nippon Sheet Glass Co. Ltd., Osaka, Japan. The non-reciprocal optical element comprises a polarization-independent isolator element formed by a plurality of components, namely a first birefringent crystal 15A, a half-wave plate 15B, a Faraday rotator 15C and a second birefringent crystal 15D. This kind of isolator is known to those skilled in the art and so will not be described further. For an example, reference may be made to the afore-mentioned article by K. Shiraishi et al.

The light launched into the lens 14 by the input fiber 10 is expanded and re-focussed by the lens 14 at the end of the output fiber 11. This "forward" light beam passes through the isolator element 15 without beam shift, resulting in small coupling loss. Light launched into the lens 14 from the output fiber 11, however, is shifted as it passes through the isolator element 15. As a result, when focussed at the input end of lens 14, it is focussed at a position which is offset away from the end of fiber 10. The extent of this beam-shifting can be determined by selecting the length of the birefringent crystals 15A and 15D. If the beam shift is larger than the diameter of the core of fiber 10, substantially none of the light launched from the output fiber 11 will be coupled into the input fiber 10, resulting in high isolation. For an explanation of the passage of light beams through a non-reciprocal device comprising birefringent crystals, a Faraday rotator and a half-wave plate, the reader is directed to U.S. Pat. No. 4,239,329 issued Dec. 16, 1980, which is incorporated herein by reference.

Lower back-reflection can be achieved by angling the ends of the lens 14 and adjusting the alignment of the fibers 10 and 11 appropriately.

Figure 2A:
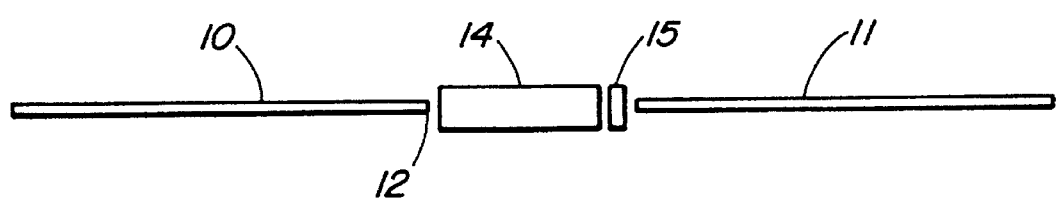
FIG. 2A is a schematic side view of an optical non-reciprocal device configured as an optical isolator.
Figure 2B:
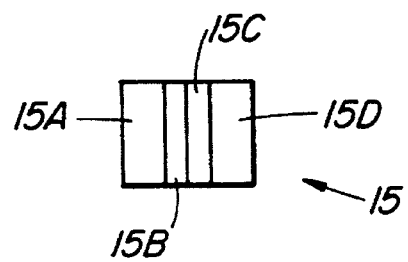
FIG. 2B is an enlarged view of a non-reciprocal element of the device of FIG. 2A.

With the configuration illustrated in FIGS. 2A and 2B, an insertion loss of 0.4 dB, back-reflection reduction of more than −60 dB, and isolation of 27 dB has been achieved with an isolator chip/non-reciprocal optical element 1.45 mm. thick and 1.25 mm. square in cross-section and a focussing lens 14 only 8.56 mm. long.

A two-stage isolator could be formed by providing a second isolator chip/non-reciprocal optical element 15 at the opposite, i.e. input end of the lens 14. High isolation and low loss will be achieved because this second isolator element will again be at or adjacent the focus of the lens 14. Of course, a two-stage isolator could be formed by providing two of the isolator elements 15 at the same end of the lens 14, in cascade. Indeed, it is envisaged that two or more isolator elements could be provided at each end if necessary. It should be appreciated that, as more isolator chips are added, the physical length of the lens 14 will need to be reduced so that the distance between foci remains the same.

When two non-reciprocal elements 15 are used, they may be so positioned that the respective displacement axes of components of one of the non-reciprocal elements are angularly offset, preferably by about 90 degrees, relative to the corresponding displacement axes of the corresponding components of the other non-reciprocal element.

A two-stage non-reciprocal element can be formed using two non-reciprocal components. Thus, it is also envisaged that a two-stage non-reciprocal element for an isolator might comprise, conveniently as a single "chip", first and second birefringent crystals with their displacement axes aligned (i.e. 0 or 180 degrees) and, between them, a first Faraday rotator, a third birefringent crystal with its axis rotated by 45 degrees relative to the first birefringent crystal, a fourth birefringent crystal with its axis rotated 135 degrees relative to the first birefringent crystal, and a second Faraday rotator. For a circulator, the third and fourth birefringent crystals could be disposed either side of the optical axis of the device.

Figure 3:
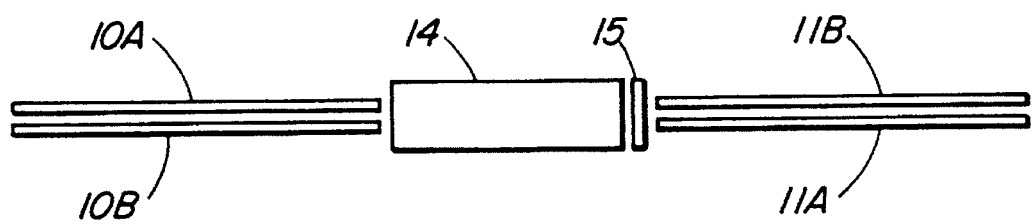
FIG. 3 is a schematic plan view of an embodiment of the invention in which a pair of input fibers are coupled to respective ones of a pair of output fibers by a single optical isolator device.

It is possible to use a single optical non-reciprocal device with several input/output pairs of fibers coupled to it simultaneously. Thus, FIG. 3 illustrates an embodiment of the invention in which light beams from a pair of input fibers 10A and 10B are coupled to respective ones of a pair of output fibers 11A and 11B by a single optical isolator device comprising, as before, a focussing lens 14 and an isolator element or chip 15. The axes of the input fibers 10A and 10B are coupled optically with the respective axes of output fibers 11A and 11B. Light from fiber 10A passes through the lens 14 and isolator chip 15 and couples to output fiber 11A. Likewise, light from input fiber 10B passes through the lens 14 and isolator element 15 to couple to output fiber 11B. The dimensions of the isolator elements are chosen so that light returning from each of the output fibers 11A and 11B does not couple into either of input fibers 10A and 10B.

By suitable choice of components, geometry and dimensions, it is possible to couple more input/output fiber pairs using the same lens 14 and isolator chip 15.

An advantage of this embodiment of the invention is that, effectively, two or more isolators are packaged in one device so that the device is inexpensive, compact and reliable. It is unlikely that such simultaneous coupling of more than one pair of fibers could be achieved with previously known devices, in which an isolator element is placed between two lenses spaced by a relatively large gap.

In the isolators according to the invention described above, the object is simply to ensure that light returning from the output fiber(s) does not reach the input fiber(s). Hence, the reverse light beam is simply diverted away from the input fiber(s). It is possible, however, to control the geometry to arrange for the light from the output fiber to couple to a third fiber, thereby forming a circulator. Examples of such circulators are illustrated in FIGS. 4A and 4B.

Figure 4A:
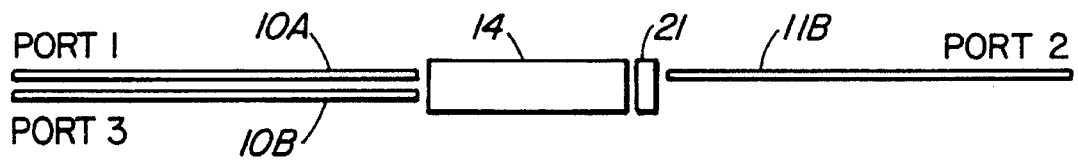
FIGS. 4A and 4B are schematic plan views of circulators embodying the invention.

Referring to FIG. 4A, first or input fiber 10A constitutes port 1 of the circulator, second or output fiber 11B constitutes port 2 and a third fiber 10B, at the same side as the input fiber 10A, constitutes port 3. A focussing lens 14 is provided as in the isolator embodiments. In this case, however, instead of an isolator chip, a circulator chip 21 is a two-stage element and is positioned between the lens 14 and the end of fiber 11B. The circulator chip 21 differs from the isolator chip 15 of FIG. 3 in that, as shown inset in FIG. 4B, it comprises a first birefringent crystal 21A, a first Faraday rotator 21B, polarization-dependent beam displacement or "walk-off" birefringent crystals 21C and 21D abutting each other along the optical axis, a second Faraday rotator 21E and a second birefringent crystal 21F. The birefringent crystals are of calcite. With this configuration, a light beam launched from port 1/fiber 10A is coupled to port 2/fiber 11B. Conversely, a light beam launched from port 2/fiber 11B couples to port 3/fiber 10B.

Figure 4B:
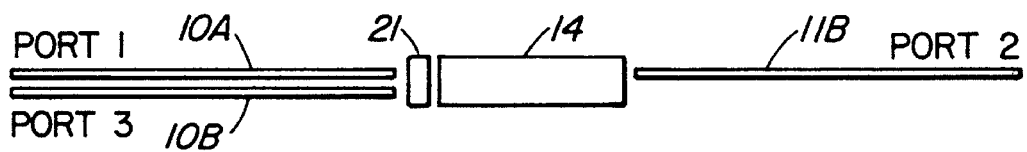

The circulator chip 21 could be positioned at the opposite end of the lens 14 as shown in FIG. 4B.

Figure 4C:
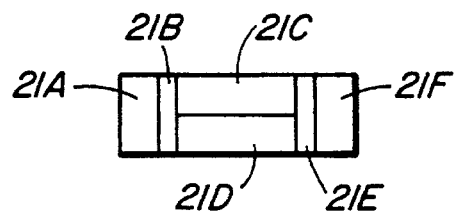
FIG. 4C is an enlarged view of a non-reciprocal element of the circulator of FIG. 4B
Figure 4D:
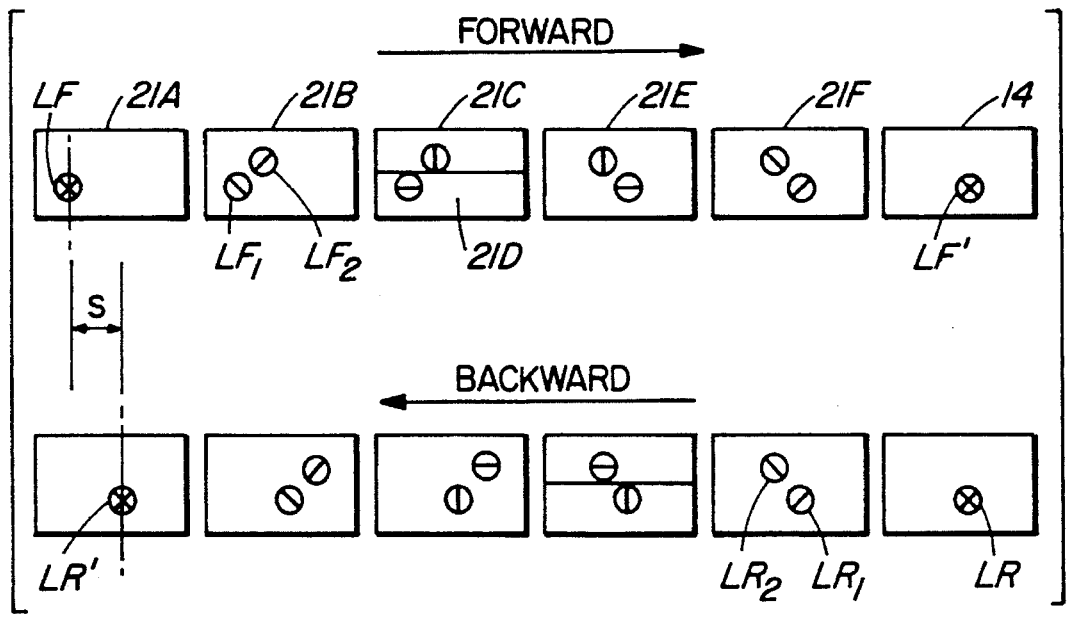
FIG. 4D illustrates operation of the circulator of FIG. 4B.

The passage of the light beams through the devices of FIGS. 4A and 4B will now be described with reference to FIG. 4D which shows the positions and polarization of the light beam components at each of the interfaces between the components 21A–21F. In the forward direction, a light beam LF from optical fiber 10A (not shown in FIG. 4C) enters the birefringent crystal 21A. Beam component $LF_1$ passes straight through the crystal 21A, while beam component $LF_2$ is displaced in the direction of its plane of polarization, i.e. at 45 degrees to the right and upwards as shown in FIG. 4C. Faraday rotator 21B rotates both beam components $LF_1$ and $LF_2$ through 45 degrees counterclockwise (as shown). The "walk-off" birefringent crystals 21C and 21D have their respective directions of displacement opposite to each other so that beam component $LF_2$ passes straight through and beam component $LF_1$ is displaced to the right as shown. The second Faraday rotator 21E rotates both beam components a further 45 degrees counterclockwise and birefringent crystal 21F recombines them as beam LF' for entry into lens 14.

In the reverse direction, a light beam LR from optical fiber 11B leaving the lens 14 is separated into components $LR_1$ and $LR_2$ by birefringent crystal 21F which allows beam component $LR_1$ to pass straight through while displacing beam component $LR_2$ obliquely. Faraday rotator 21E rotates both beams through 45 degrees counterclockwise. Beam component $LR_1$ passes straight through "walkoff" crystal 21D and beam component $LR_2$ is displaced to the right by "walk-off" crystal 21C so that the backward-travelling beam components arrive at the Faraday rotator 21B alongside the forward-travelling beam components. The Faraday rotator 21B rotates both beam components through 45 degrees and birefringent crystal 21A recombines them by allowing beam component $LR_1$ to pass straight through and displacing beam component $LR_2$ obliquely. The recombined beam LR' is displaced by distance S relative to the input beam LF and so couples to the optical fiber 10B in the case of the circulator of FIG. 4B or discard in the case of the isolator of FIG. 1.

It is possible to add more input and output optical waveguides to form a circulator having four or more ports.

The focussing lens 14 need not be a single element, but could be formed by two or more elements providing the focal length of the combination is such that the light from a fiber at one end is focussed at the end of the designated fiber at the opposite end. An advantage of forming the lens 14 from several elements is that other optical elements can be inserted, conveniently at a position where the beam width is expanded.

Figure 5:
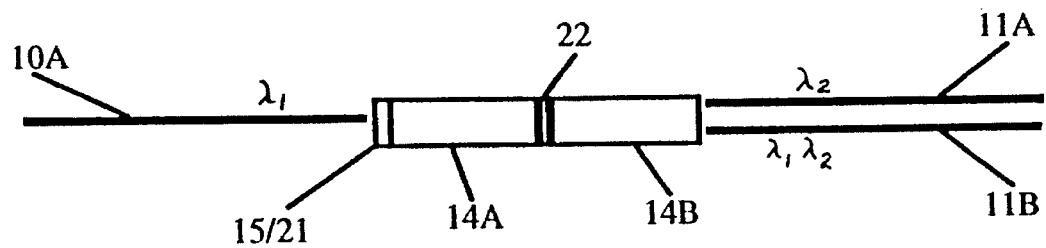
FIG. 5 illustrates an embodiment of the invention in which a non-reciprocal isolator is combined with a filter.

FIG. 5 illustrates such an arrangement in which the lens 14 comprises two grin-rod lenses 14A and 14B with a filter 22 interposed between them. The lens element 14B is one quarter pitch long and lens element 14A is one quarter pitch less the length of the non-reciprocal element 15/21. The filter may comprise, for example, a multilayer interferometric filter providing differential transmission and reflection according to wavelength. An isolator chip 15 is positioned between input fiber 10A and the juxtaposed end of lens element 14A. A light beam from fiber 10A with wavelength $\lambda_1$ passes through lens element 14A, expanding until it is collimated upon arrival at filter 22, and is then re-focussed by lens element 14B into fiber 11B. A light beam from fiber 11A with wavelength $\lambda_2$ will be reflected by the filter 22 and re-focussed into fiber 11B.

This device provides an integrated isolator/wavelength-division multiplexer hybrid device which exhibits low loss and can be very compact in size.

Various other devices can be realized according to the present invention.

It is envisaged that an isolator/coupler hybrid could be formed by interposing a partial reflector in the position of filter 22 of FIG. 5.

Figure 6A:
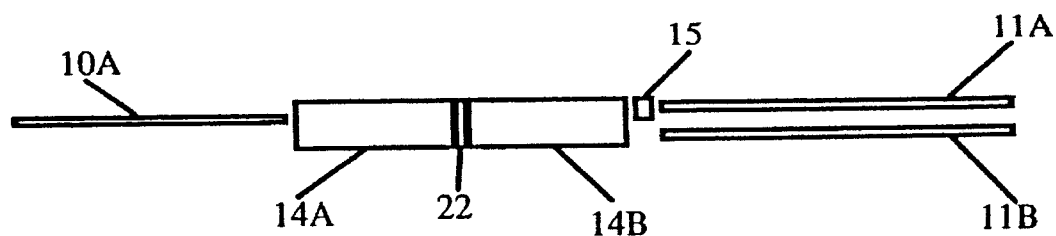
FIGS. 6A and 6B illustrate alternative embodiments of the invention.
Figure 6B:
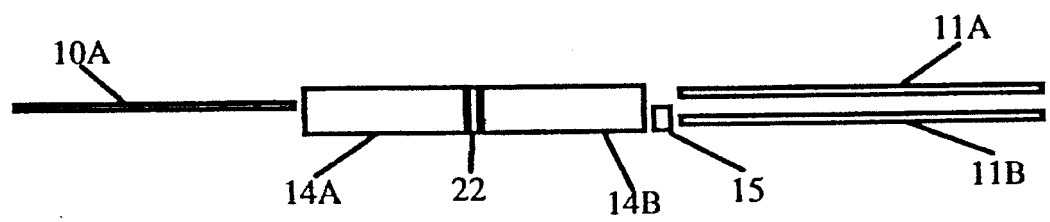

It should be appreciated that the isolator chip 15 could be placed between the lens element 14B and one or other of the fibers 11A and 11B rather than as shown in FIG. 5. It is also envisaged that two stage isolation could be provided by one or more isolator chips at each end of the lens, as described with respect to the embodiment of FIG. 3. In such a case, the isolator chip at the output end would be positioned between the lens 14 and only one of the output fibers, as illustrated in FIGS. 6A and 6B. Thus, the devices of FIGS. 6A and 6B would provide isolation of the signal of wavelength $\lambda_2$.

It will be appreciated that, in each of the above-described embodiments of the invention, the length of the lens 14 will be adjusted to take account of the thickness of the isolator/circulator chip and any filters or other elements interposed between lens elements, the requirement being that a light beam from a fiber at one end will be focussed to the designated fiber at the opposite end. It should also be appreciated that, although the isolator/circulator chips 15/21 are placed at or near the focus to ensure that the beam width, and hence the required beam displacements are small, other optical elements such as filter 22 can be placed wherever is appropriate.

An advantage of using a sandwich arrangement of isolator/circulator components adjacent the focus of the focussing lens, as taught by the present invention, is that the isolator/circulator components can be manufactured as a larger plate and diced, reducing manufacturing costs. Moreover, placing both birefringent crystals and the Faraday rotator together at the focus enables non-reciprocal devices other than a single stage isolator to be made, such as the two-stage isolators and integrated WDM coupler described herein.

Although embodiments of the invention have been described and illustrated in detail, it is to be clearly understood that the same is by way of illustration and example only and is not to be taken by way of the limitation, the spirit and scope of the present invention being limited only by the appended claims.

What is claimed is:

1. A non-reciprocal optical waveguide-coupling device comprising a first optical waveguide and a second optical waveguide coupled by a common optical path, respective ends of the first and second optical waveguides being spaced apart along the optical path, focusing lens means disposed in the optical path between the respective ends of the first optical waveguide and the second optical waveguide, the focusing lens means having foci at or near respective ends of the waveguides, such that light beams leaving one of the foci will be re-focused by the focusing lens means at the other of the foci before coupling into the second optical waveguide, and a non-reciprocal element comprising a plurality of optical components, the components cooperating so that light beams from the first optical waveguide couple into the second optical waveguide but light beams from the second optical waveguide do not couple into the first optical waveguide, all of said components being situated adjacent one of the foci, the device further comprising at least one optical waveguide adjacent the first optical waveguide and at least one optical waveguide adjacent the second optical waveguide, the arrangement being such that light beams from the at least one optical waveguide adjacent the first optical waveguide are coupled into the at least one optical waveguide adjacent the second optical waveguide, while light beams from the at least one optical waveguide adjacent the second optical waveguide are displaced away from the at least one optical waveguide adjacent the first optical waveguide.

2. A non-reciprocal optical waveguide-coupling device comprising a first optical waveguide and a second optical waveguide coupled by a common optical path, respective ends of the first and second optical waveguides being spaced apart along the optical path, focusing lens means disposed in the optical path between the respective ends of the first optical waveguide and the second optical waveguide, the focusing lens means having foci at or near respective ends of the waveguides, such that light beams leaving one of the foci will be re-focused by the focusing lens means at the other of the foci before coupling into the second optical waveguide, and a non-reciprocal element comprising a plurality of optical components, the components cooperating so that light beams from the first optical waveguide couple into the second optical waveguide but light beams from the second optical waveguide do not couple into the first optical waveguide, all of said components being situated adjacent one of the foci, the device further comprising at least one additional optical waveguide, the non-reciprocal element being configured such that light beams from the first optical waveguide are coupled into the second optical waveguide and light beams from the second optical waveguide are coupled into said at least one additional waveguide.

3. A device as claimed in claim 2, wherein the non-reciprocal element is positioned adjacent the first optical waveguide.

4. A device as claimed in claim 2, wherein the non-reciprocal element is positioned adjacent the second optical waveguide.

5. A device as claimed in claim 2, wherein the non-reciprocal element comprises, in succession, a first birefringent component for splitting an input light beam travelling in a forward direction into two orthogonally polarized light beam components, a second birefringent component for recombining the light beam components travelling in the forward direction and for splitting a light beam from the second optical waveguide into two orthogonally-polarized light beam components travelling in the reverse direction, and, disposed between the first birefringent component and the second birefringent component, a third birefringent component for displacing the light beam components passing therethrough and polarization-rotation components for rotating respective polarization directions of the light beam components, such that light beams from the first optical waveguide are coupled into the second optical waveguide and light beam components travelling in the reverse direction from the second optical waveguide are displaced away from the first optical waveguide and recombined by the first birefringent component and coupled into said at least one additional waveguide.

6. A non-reciprocal optical waveguide-coupling device comprising a first optical waveguide and a second optical waveguide coupled by a common optical path, respective ends of the first and second optical waveguides being spaced apart along the optical path, focusing lens means disposed in the optical path between the respective ends of the first optical waveguide and the second optical waveguide, the focusing lens means having foci at or near respective ends of the waveguides, such that light beams leaving one of the foci will be re-focused by the focusing lens means at the other of the foci before coupling into the second optical waveguide, and at least two non-reciprocal elements each situated adjacent one of the foci, between the focusing lens means and an adjacent end of one of the optical waveguides, each of the non-reciprocal elements comprising a plurality of optical components comprising, in succession, a first birefringent component for splitting an input light beam travelling in a forward direction into two orthogonally polarized light beam components, a second birefringent component for recombining the light beam components travelling in the forward direction and for splitting a light beam from the second optical waveguide into two orthogonally-polarized light beam components travelling in the reverse direction, and, disposed between the first birefringent component and the second birefringent component, polarization rotation components for rotating respective polarization directions of the light beam components, the arrangement being such that light beams leaving the first optical waveguide are coupled into the second optical waveguide but light beams leaving the second optical waveguide are displaced away from, and do not couple into, the first optical waveguide.

7. A device as claimed in claim 6, wherein each of the two non-reciprocal elements is positioned adjacent a respective one of the foci of the focusing lens means.

8. A device as claimed in claim 6, wherein the first and second non-reciprocal elements are so disposed that respective displacement axes of components of one of the elements are angularly displaced about a longitudinal axis of the optical path relative to the displacement axes of corresponding components of the other of the non-reciprocal elements.

9. A device as claimed in claim 8, wherein the angular displacement is about ninety degrees.

10. A device as claimed in claim 9, wherein the rod lens means comprises two graded-index rod lenses each of substantially one quarter pitch and an additional optical element is interposed between them.

11. A non-reciprocal optical waveguide-coupling device comprising a first optical waveguide and a second optical waveguide coupled by a common optical path, respective ends of the first and second optical waveguides being spaced apart along the optical path, focusing lens means disposed in the optical path between the respective ends of the first optical waveguide and the second optical waveguide, the focusing lens means having foci at or near respective ends of the waveguides, such that light beams leaving one of the foci will be re-focused by the focusing lens means at the other of the foci before coupling into the second optical waveguide, and a non-reciprocal element situated adjacent one of the foci, between the focusing lens means and an adjacent end of one of the optical waveguides, the non-reciprocal element comprising a plurality of optical components comprising, in succession, a first birefringent component for splitting an input light beam travelling in a forward direction into two orthogonally polarized light beam components, a second birefringent component for recombining the light beam components travelling in the forward direction and for splitting a light beam from the second optical waveguide into two orthogonally-polarized light beam components travelling in the reverse direction, and, disposed between the first birefringent component and the second birefringent component, polarization rotation components for rotating respective polarization directions of the light beam components, the arrangement being such that light beams leaving the first optical waveguide are coupled into the second optical waveguide but light beams leaving the second optical waveguide are displaced away from, and do not couple into, the first optical waveguide, wherein the focusing lens means comprises at least first and second lens elements and an additional optical element is interposed between said lens elements.

12. A device as claimed in claim 8, wherein the additional optical element comprises a filter interposed between said lens elements.

13. A device as claimed in claim 8, wherein the additional optical element comprises a partial reflector interposed between said lens elements, the device further comprising an additional optical waveguide for receiving light beams reflected by the partial reflector.

14. A device as claimed in claim 13, wherein the non-reciprocal element is disposed between the lens means and one of the second optical waveguide and the additional optical waveguide.

15. A non-reciprocal optical waveguide-coupling device comprising a first optical waveguide and a second optical waveguide coupled by a common optical path, respective ends of the first and second optical waveguides being spaced apart along the optical path, focusing lens means disposed in the optical path between the respective ends of the first optical waveguide and the second optical waveguide, the focusing lens means having foci at or near respective ends of the waveguides, such that light beams leaving one of the foci will be re-focused by the focusing lens means at the other of the foci before coupling into the second optical waveguide, and a non-reciprocal element situated adjacent one of the foci, between the focusing lens means and an adjacent end of one of the optical waveguides, the non-reciprocal element comprising a plurality of optical components comprising, in succession, a first birefringent component for splitting an input light beam travelling in a forward direction into two orthogonally polarized light beam components, a second birefringent component for recombining the light beam components travelling in the forward direction and for splitting a light beam from the second optical waveguide into two orthogonally-polarized light beam components travelling in the reverse direction, and, disposed between the first birefringent component and the second birefringent component, polarization rotation components for rotating respective polarization directions of the light beam components, the arrangement being such that light beams leaving the first optical waveguide are coupled into the second optical waveguide but light beams leaving the second optical waveguide are displaced away from, and do not couple into, the first optical waveguide, wherein the focusing lens means comprises a graded-index rod lens means having a length less than the distance between the foci by about the optical length of the non-reciprocal element and the non-reciprocal element is positioned between one end of the rod lens means and the adjacent waveguide.

16. A non-reciprocal optical waveguide-coupling device comprising a first optical waveguide and a second optical waveguide coupled by a common optical path, respective ends of the first and second optical waveguides being spaced apart along the optical path, focusing lens means disposed in the optical path between the respective ends of the first optical waveguide and the second optical waveguide, the focusing lens means having foci at or near respective ends of the waveguides, such that light beams leaving one of the foci will be re-focused by the focusing lens means at the other of the foci before coupling into the second optical waveguide, and a non-reciprocal element comprising a plurality of optical components, the components cooperating so that light beams from the first optical waveguide couple into the second optical waveguide but light beams from the second optical waveguide do not couple into the first optical waveguide, all of said components being situated adjacent one of the foci, further comprising at least one additional waveguide, the focussing lens means comprising a first lens element and a second lens element, an optical element being interposed between the first lens element and the second lens element for coupling light beams selectively between the optical waveguides, the non-reciprocal element being provided between the lens means and one of the second optical waveguide and additional optical waveguide.

17. A device as claimed in claim 8, further comprising at least one additional waveguide, the additional optical element comprising a wavelength dependent filter interposed between the first lens element and the second lens element, the filter providing different degrees of transmission and reflection according to wavelength of the light beams passing therethrough, such that a light beam with a first wavelength from the first optical waveguide will be coupled into the second optical waveguide and a light beam with a second wavelength from the at least one additional optical waveguide will be coupled into the second waveguide.

18. A device as claimed in claim 13, wherein the non-reciprocal element is disposed between the lens means and one of the second optical waveguide and the additional optical waveguide.

* * * * *